United States Patent [19]

Yu et al.

[11] Patent Number: 5,263,096
[45] Date of Patent: Nov. 16, 1993

[54] OPTO-ELECTRONIC MORPHOLOGICAL PROCESSOR

[75] Inventors: Jeffrey W. Yu, Granada Hills; Tien-Hsin Chao, Valencia; Li J. Cheng, La Cresenta; Demetri Psaltis, Pasadena, all of Calif.

[73] Assignee: California Institute of Technology, Pasadena, Calif.

[21] Appl. No.: 678,498

[22] Filed: Apr. 1, 1991

[51] Int. Cl.$^5$ .......................... G06K 9/40; G09G 3/36; G02B 1/06
[52] U.S. Cl. ........................................ 382/27; 359/85; 382/54; 382/65; 345/87
[58] Field of Search ....................... 382/55, 65, 31, 32, 382/27, 49, 68, 54; 359/107, 108, 84, 85; 340/765, 784

[56] References Cited

U.S. PATENT DOCUMENTS

| | | | |
|---|---|---|---|
| 3,248,552 | 4/1966 | Bryan | 382/32 |
| 4,559,643 | 12/1985 | Brogardh | 382/32 |
| 4,742,552 | 5/1988 | Andrews | 382/41 |
| 4,816,816 | 3/1989 | Usui | 340/765 |
| 4,845,766 | 7/1989 | Peppers et al. | 382/32 |
| 5,086,483 | 2/1992 | Capps | 382/68 |
| 5,131,055 | 7/1992 | Chao | 382/32 |

Primary Examiner—Leo H. Boudreau
Attorney, Agent, or Firm—Leonard Tachner

[57] ABSTRACT

The opto-electronic morphological processor of the present invention is capable of receiving optical inputs and emitting optical outputs. The use of optics allows implementation of parallel input/output, thereby overcoming a major bottleneck in prior art image processing systems. The processor consists of three components, namely, detectors, morphological operators and modulators. The detectors and operators are fabricated on a silicon VLSI chip and implement the optical input and morphological operations. A layer of ferro-electric liquid crystals is integrated with a silicon chip to provide the optical modulation. The implementation of the image processing operators in electronics leads to a wide range of applications and the use of optical connections allows cascadability of these parallel opto-electronic image processing components and high speed operation. Such an opto-electronic morphological processor may be used as the pre-processing stage in an image recognition system. In one example disclosed herein, the optical input/optical output morphological processor of the invention is interfaced with a binary phase-only correlator to produce an image recognition system.

1 Claim, 9 Drawing Sheets

OPTO-ELECTRONIC MORPHOLOGICAL PROCESSOR

ORIGIN OF INVENTION

The invention described herein was made in the performance of work under a NASA contract, and is subject to the provisions of Public Law 96-517 (35 USC 202) in which the Contractor has elected to retain title.

TECHNICAL FIELD

The present invention relates generally to electro-optics and more specifically to a morphological processor designed to utilize optical input and optical output in conjunction with VLSI electronics, thus permitting optical cascading in order to form more complex systems while still providing for electronic morphological processing which results in flexibility and programability and avoids the problems stemming from a lack of generally useful, non-linear optical devices.

BACKGROUND ART

The use of optics in computing systems holds a great deal of promise. The high speed and three-dimensional nature of optics allows one to solve the connectivity and input/output limitations of electronics systems. However, a major limitation in the implementation of an all-optical computing system is the lack of generally useful non-linear optical devices (i.e., the analog of the electronic transistor). As in the case of electronic computers, the presence of a device like the transistor allows one to implement systems using a building block concept. This results in highly flexible technology with standardized design and verification capabilities. Typically, electronic systems are limited by the amount of connectivity that can be supported in the area of the chip and pinout limitations in the connections between chips. This, in turn, limits the degree of parallelism which can be implemented in an all-electronic system. By integrating electronic computation with optical connectivity, the advantages of each technology can compensate for the limitation of the other.

The success of such a hybrid approach is critically dependant on the choice of the problem that needs to be solved. Specifically, it is necessary that the problem require a high degree of parallelism. Image processing is a prime example of such a problem because the input signal itself often consists of a very large number of pixels that can be processed in parallel. The operations that are typically performed in order to recognize the image consists of relatively simple pre-processing steps that extract features, such as edges, depth, parallax, etc. Such operations are generally local, shift invariant operations that can be implemented in a straight forward way electronically. The difficulty in the electronic implementation of these pre-processing steps are the bottlenecks that exist in communicating images/data in and out of the chips that compute each of these operations. The opto-electronic method of the present invention provides a solution to this problem by allowing parallel transfer of a complete frame between chips. Moreover, it directly provides a parallel optical input for the classification/recognition stage of the system. The input to this next stage is, in general, a combination of features, extracted images which are then compared against the stored data to provide a match between the input and stored patterns and hence recognize the input. In the simplest case, this next stage can be an optical correlator. Other more complex possibilities include optoelectronic implementations of a multi-layer neural network architecture or a hierarchical rule-based classification tree. In any case, the ability to optically transfer the results of the pre-processing stage to the classification stage in parallel, eliminates a crucial bottleneck. In the invention disclosed herein, an opto-electronic chip capable of electronically performing morphological operations to extract features from images, remove noise and have an optical, parallel input/output capability is disclosed. This chip may then be used as an input stage to an optical, binary phase-only correlator.

Morphological operators are a class of operators which have become increasingly important in image processing and vision systems. Binary, morphological operations, such as dilation and erosion, are useful in extracting image features, removing noise and edge enhancement. These techniques have been utilized in vision applications such as object recognition, image segmentation and industrial inspection.

Morphological operations can be considered to be the application of local neighborhood operations on images. As an example, it has been demonstrated that the binary erosion and dilation operators can be implemented by convolving the input image with an image consisting of the structuring element and thresholding the resultant image. This structuring element is typically much smaller than the input image, usually a 3×3 or 5×5 pixel object. The small size of the structuring element makes electronics a very efficient method of implementing the morphological operations. Typically, the computation of the output at a single pixel will require connections only with its nearest neighbors. As a result, the implementation of morphological operations is not limited by the connectivity bottleneck that plagues more complex imaging processing algorithms, such as image correlation. The major bottleneck in most image processing systems is the communications between each level of processing. Electronic systems typically perform the pre-processing, store the information and serially transmit the information to the processing stage. Through use of optics and its parallel input/output capabilities, the present invention, as will be seen hereinafter, bypasses this crucial bottleneck.

SUMMARY OF THE INVENTION

The present invention comprises an opto-electronic morphological optical processor which may be used as the pre-processing stage for an optical correlator system. The processor uses the electronics to compute the image morphological operations and optics to relay the image to other morphological processors and the optical correlator. The opto-electronic morphological processor of the present invention is capable of receiving optical inputs and emitting optical outputs. The use of optics allows implementation of parallel input/output, thereby overcoming a major bottleneck in prior art image processing systems. The processor consists of three components, namely, detectors, morphological operators and modulators. The detectors and operators are fabricated on a silicon VLSI chip and implement the optical input and morphological operations. A layer of ferro-electric liquid crystals is integrated with a silicon chip to provide the optical modulation. The implementation of the image processing operators in electronics leads to a wide range of applications and the use of optical connections allows cascadability of these parallel opto-electronic image processing components and high speed operation. Such an opto-electronic morphological processor may be used as the pre-processing stage in an image recognition system. In one example disclosed herein, the optical input/optical output morphological processor of the invention is interfaced with a binary phase-only correlator to produce an image recognition system as will be disclosed hereinafter in more detail.

OBJECTS OF THE INVENTION

It is therefore a principal object of the present invention to provide an opto-electronic morphological optical processor which may be used as the pre-processing stage for a binary phase-only optical correlator system.

It is an additional object of the present invention to provide an opto-electronic morphological optical processor which uses electronics to compute image morphological operations while it uses optics to relay the processed image to other morphological processors and an optical correlator.

It is still an additional object of the present invention to provide an opto-electronic morphological optical processor capable of receiving optical inputs and emitting optical outputs to permit implementation of parallel input/output while using silicon VLSI implemented electronics to carry out the morphological operations.

BRIEF DESCRIPTION OF THE DRAWINGS

The aforementioned objects and advantages of the present invention, as well as additional objects and advantages thereof, will be more fully understood hereinafter as a result of a detailed description of a preferred embodiment when taken in conjunction with the following drawings in which.

DETAILED DESCRIPTION OF A PREFERRED EMBODIMENT

Figure 1:
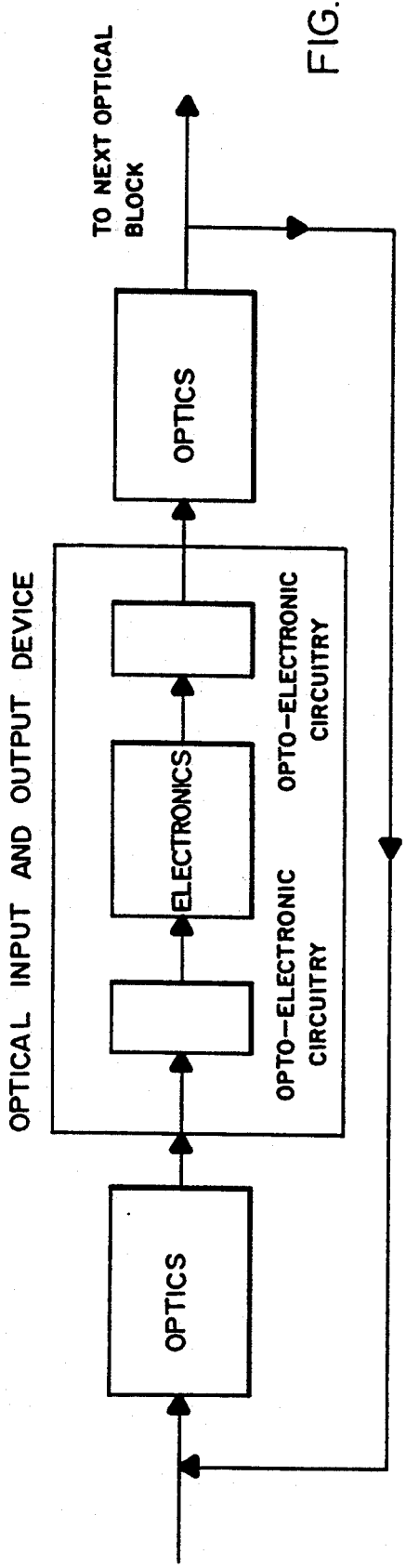
FIG. 1 illustrates in block diagram form, an ideal opto-electronic system having an optical input, an optical output and an electronic processor.

The present invention stems from a project the long term goal of which is to produce opto-electronic building blocks suitable for image processing. These blocks combine the computational flexibility of electronics and the high connectivity and parallelism of optics. Such a building block is shown generically in FIG. 1. In the system shown in FIG. 1, an opto-electronic block is created, having the capability of receiving optical inputs, producing optical outputs and performing computations electronically. The block therefore comprises three stages, an optical to electronic signal converter, an electronic processor and an electronic to optics converter. The optical output information may be then relayed in parallel to a subsequent opto-electronic block, fed back to the same block or used as an input to an all-optical processor. The functionality of each block may be determined by the design of the electronic circuits and the optical interconnection pattern. A major difficulty in the design of this block is to produce a system without internal bottlenecks. In order to maintain the advantages of optical communication, the circuitry within the opto-electronic block must maintain a high degree of parallelism. This consideration guides the choice of functions for which this type of opto-electronic implementation is most advantageous. One such function is the implementation of morphological image operations which are described hereinafter.

Figure 2:
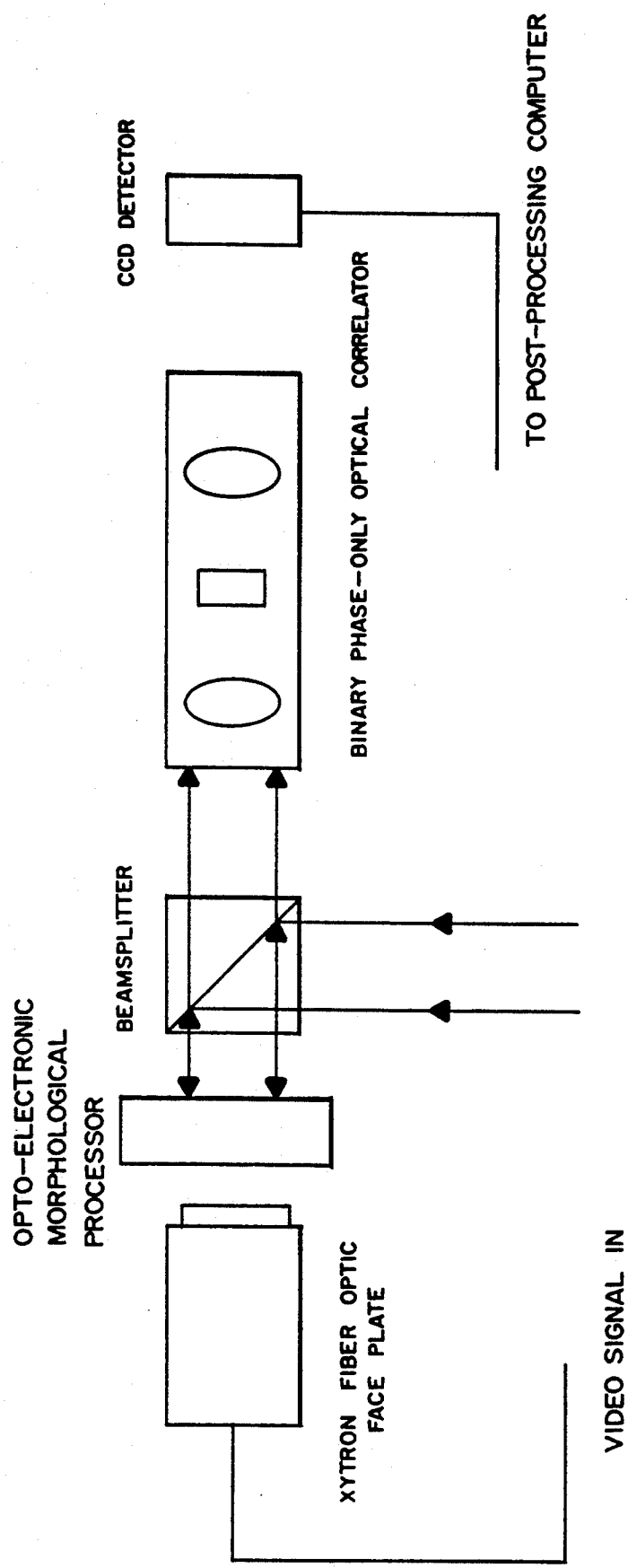
FIG. 2 is a block diagram representation of an optical correlator system, using an optical input/optical output morphological processor of the present invention for pre-processing the input prior to correlation.

FIG. 2 comprises a block diagram of the opto-electronic morphological optical correlator system which uses the opto-electronic morphological processor of the present invention. The processor comprises an array of 128 by 128 pixels and has an update frame rate on the order of 10 KHz. The device is capable of performing binary, morphological operations. Some of the processing operations implemented in this processor include erosion, dilation, opening, closing, edge enhancement and skeletonization. There is also the possibility of extending the functionality of the device to process gray level imagery. As seen in FIG. 2, the optical correlator system with which the invention may be utilized, comprises an input video source, a Xytron fiber optic face plate, the opto-electronic morphological processor of the invention, a beam splitter, a binary phase-only optical correlator, a CCD detector and a post-processing computer. The Xytron fiber optic face plate presents the image to the opto-electronic morphological processor which has the task of reducing the amount of clutter in the image. The image is then converted to a coherent replica having a laser generated read-out beam. This image is then presented to the optical connector. The beam splitter acts as a means of reading out a reflective device. The optical correlator acts as a template matcher which compares the incoming image with a reference and generates an output which reveals those points in the image which are matched to the reference. This output is applied to a CCD detector and a post-processing computer to permit analysis of the correlated image.

Figure 3:
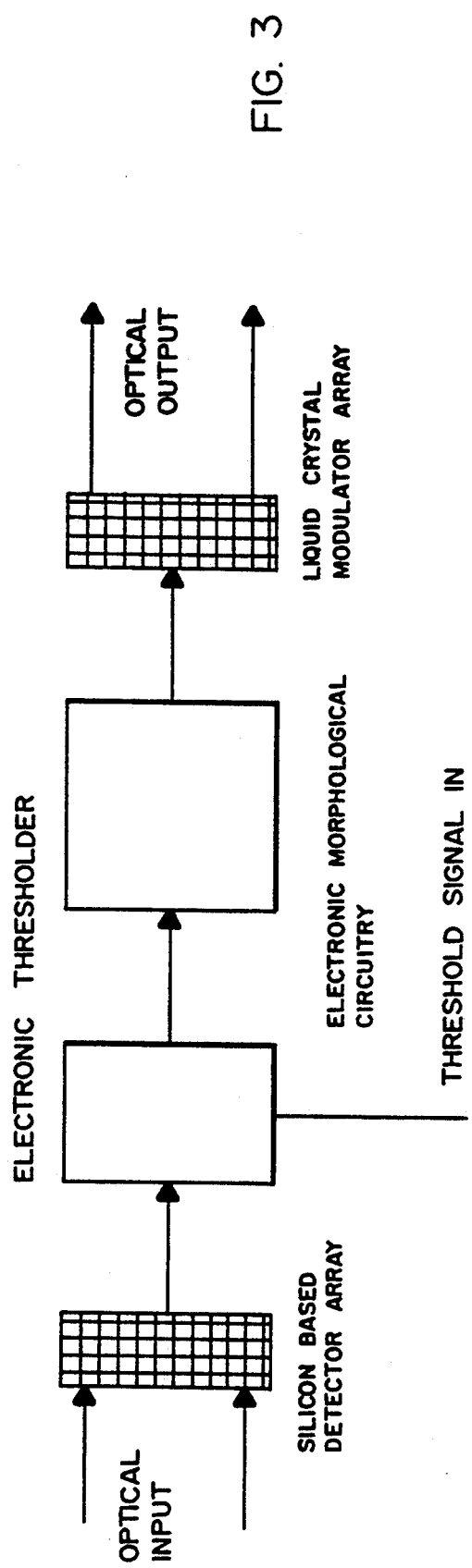
FIG. 3 is a block diagram representation of the optical input/optical output morphological processor of the present invention.

The present invention consists of the opto-electric morphological processor which has the function of reducing clutter in the optical correlator of FIG. 2. The block diagram of this morphological processor or preprocessor is shown in FIG. 3. The morphological processor of FIG. 3 comprises a plurality of separate stages. The first stage is a silicon optical detector array which is used to sense the incoming optical input and convert it to an electrical signal. This electronic signal, which is in an analog format is then compared against an externally driven threshold signal to produce a binary output. This output is then morphologically processed using the electronics within the morphological circuitry. These electronics are fabricated on silicon, using standard VLSI techniques. The action of the morphological processor will be further described hereinafter. The output of the morphological processed image is then used to address the elements of a liquid crystal array. The state of each pixel controls the reflectivity of the liquid crystal array. By using an external laser source, one can read out the information impressed on the liquid crystal array.

Figure 4C:
FIGS. 4a, 4b and 4c illustrate the first step in a closing morphological operation for removing salt noise.
Figure 4B:
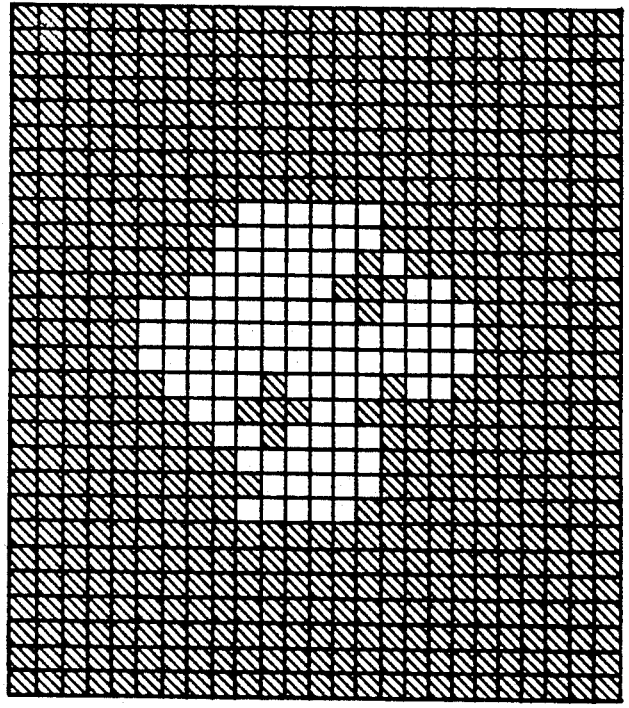
Figure 4A:
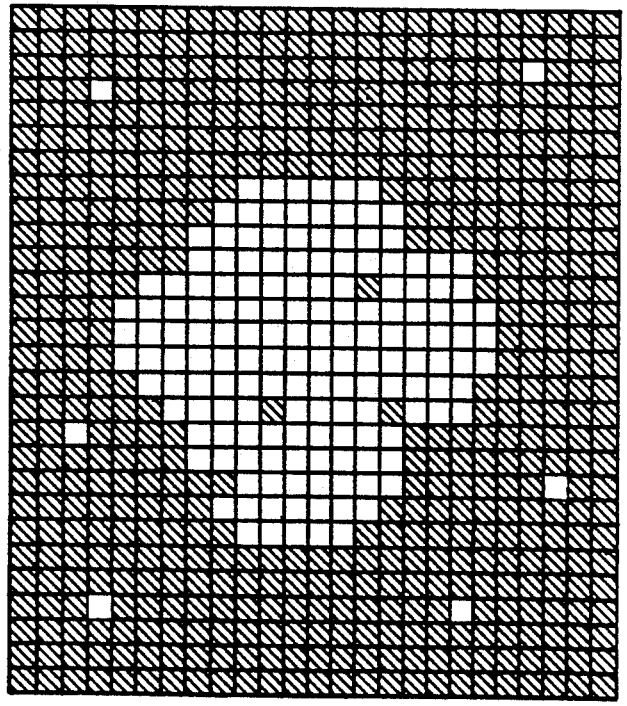
Figure 5C:
FIGS. 5a, 5b and 5c illustrate the second step in the closing morphological operation to remove salt noise.
Figure 5B:
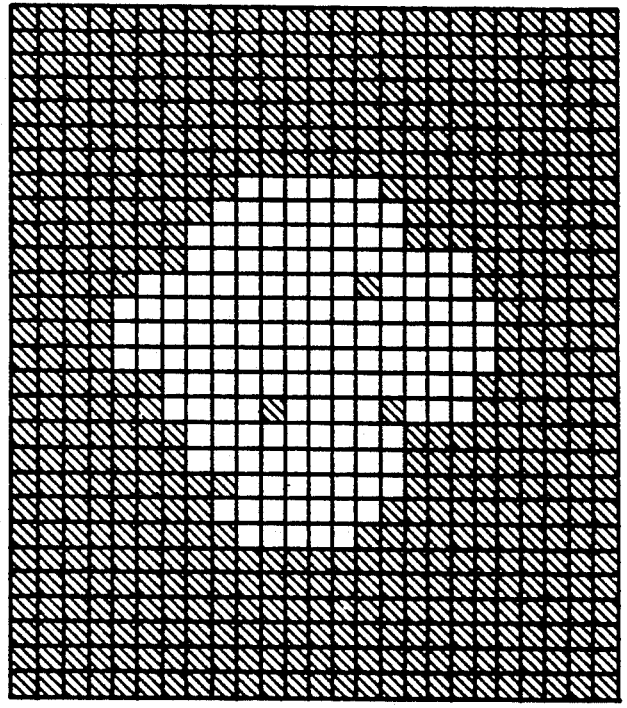
Figure 5A:
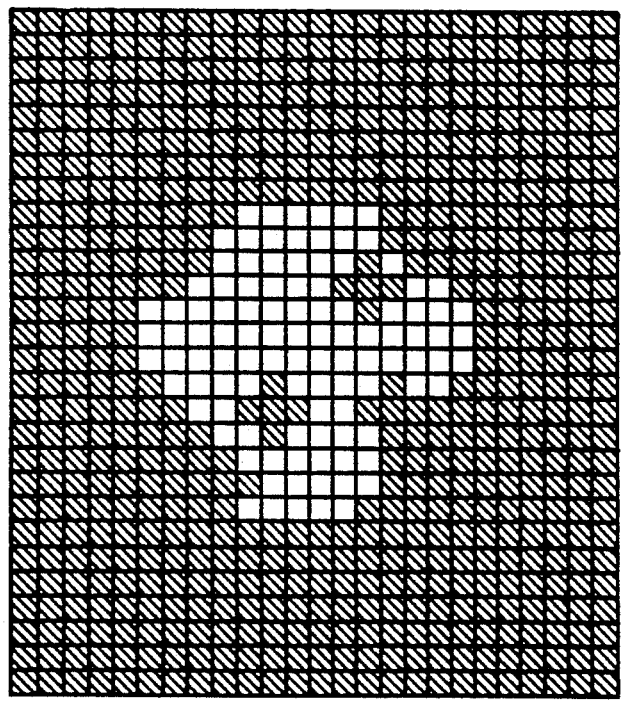

Exemplary morphological operations performed by the electronic circuitry in the third stage of the block diagram of FIG. 3, are illustrated in FIGS. 4 through 9 which will now be described. FIGS. 4 and 5 illustrate a closing morphological operator, a two stage process which is used to remove what is known as salt noise which is single white pixels on a black background. FIG. 4a represents an example of an image that might be presented to the opto-electronic morphological processor of FIG. 2. FIG. 4b illustrates the effect of applying the morphological operator of FIG. 4c to the pixel elements shown in FIG. 4a. More specifically, an erosion operator is applied whereby the structuring element, a 3×3 matrix cross, shown in FIG. 4c, is tested against each pixel of FIG. 4a. If an exact match occurs between the structuring element and each white element or pixel, that pixel is left white. However, if there is not an exact match therebetween, the pixel is changed from white to black. The erosion operator therefore has the effect of removing individual white pixels disbursed around the boundary of the image. After the erosion stage, the morphological processor performs the second dilation step illustrated in FIG. 5. More specifically, the image of FIG. 5a, which is the same as that of FIG. 4b, is tested against the morphological operator illustrated in FIG. 5c, except that here in the dilation stage, anywhere the morphological operator overlaps a white pixel, it replaces the pixels around the center pixel with the structuring element. The result is the image shown in FIG. 5b which is essentially the same as the image shown in FIG. 4a with the single event white pixels of the image having been removed and thus completing the removal of so called "salt noise".

Figure 6C:
FIGS. 6a, 6b and 6c illustrate the first step in the opening morphological operation for removing pepper noise.
Figure 6B:
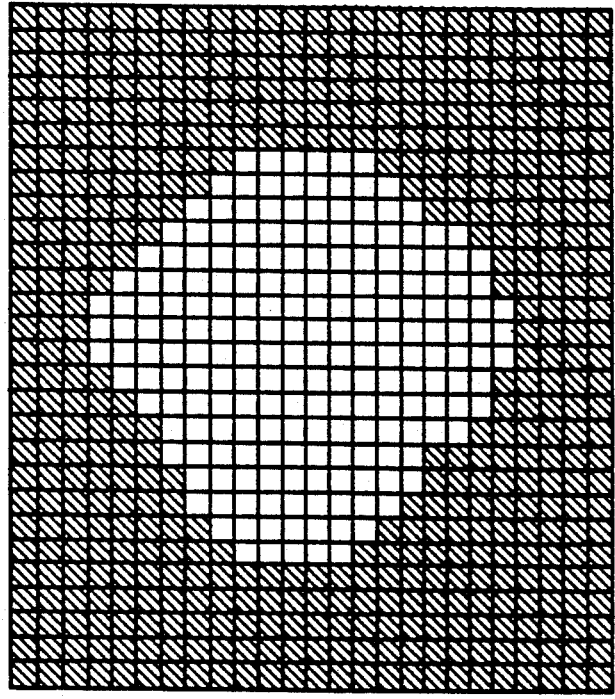
Figure 6A:
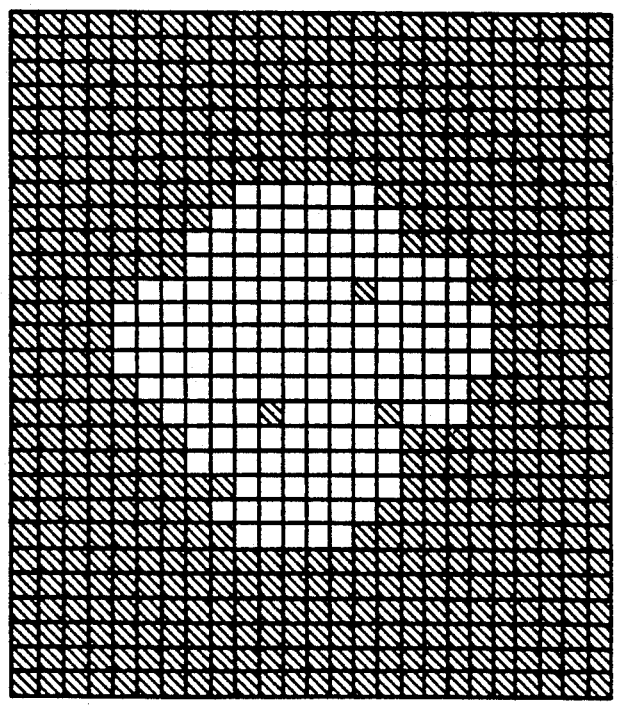
Figure 7C:
FIGS. 7a, 7b and 7c illustrate the second step in the opening morphological operation for removing pepper noise.
Figure 7B:
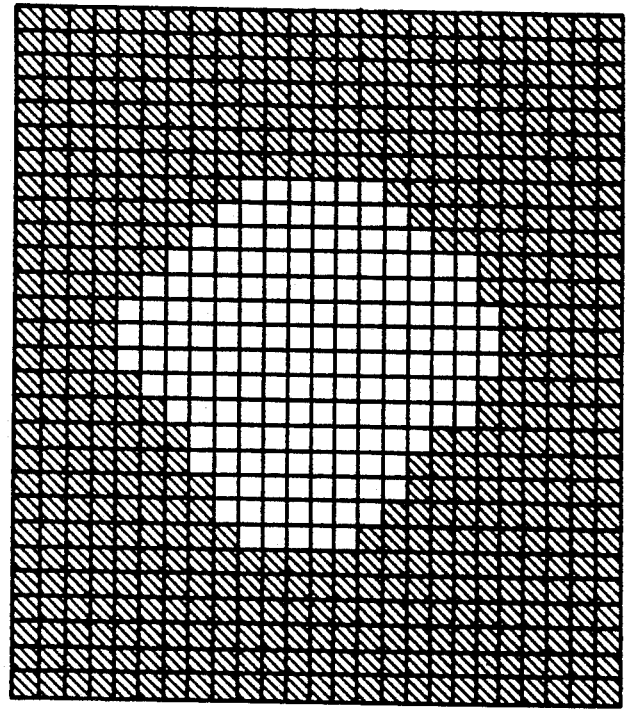
Figure 7A:
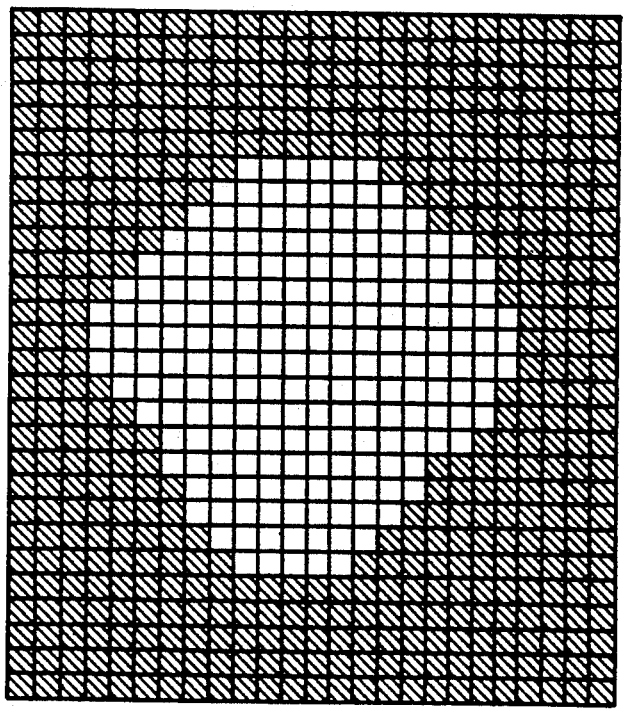

The next step in the process of the morphological processor of the present invention comprises the opening morphological operations depicted in FIGS. 6 and 7 for removing so-called "pepper noise" which is a single black pixel on a white background. More specifically, the image of FIG. 6a, which is the same as the image shown in FIG. 5b, is tested against the morphological operator shown in FIG. 6c through a dilation step, where again, any white pixel, is replaced with the structuring element of FIG. 6c, resulting in the image shown in FIG. 6b. This step is followed by an erosion step which is depicted in FIG. 7. More specifically, the image in FIG. 7a which is the same as the image in FIG. 6b has applied to it the morphological structuring element shown in FIG. 7c through an erosion stage where white pixels are replaced with black pixels where there is not an exact match between the morphological structuring element and that portion of the image being tested. The result is the image shown in FIG. 7b. Comparing FIG. 4a with 7b, it will be seen that all of the salt nose, as well as all of the pepper noise has been removed from the image by combining a closing morphological operator with an opening morphological operator in the manner depicted in FIGS. 4 through 7.

Figure 8:
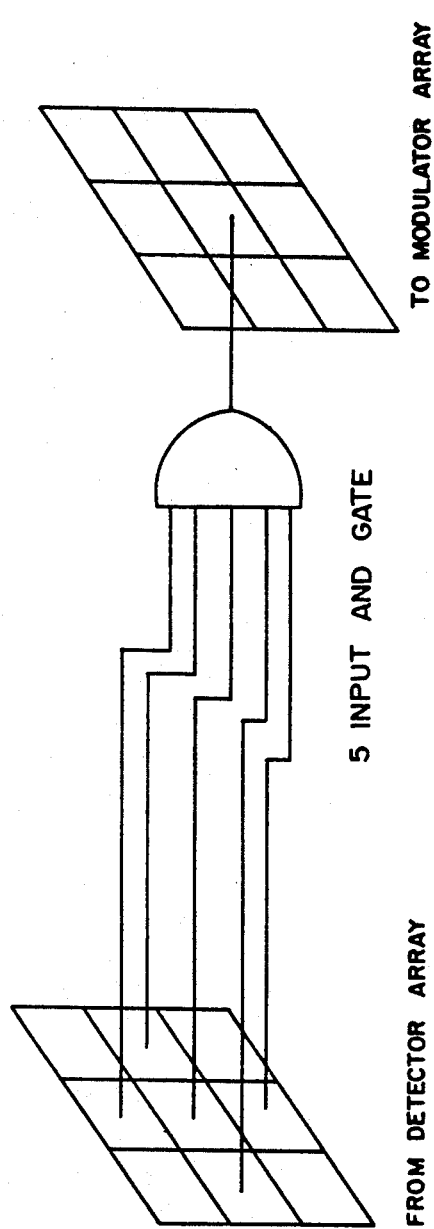
FIG. 8 illustrates the erosion morphological circuitry of the opto-electronic morphological processor of the present invention.
Figure 9:
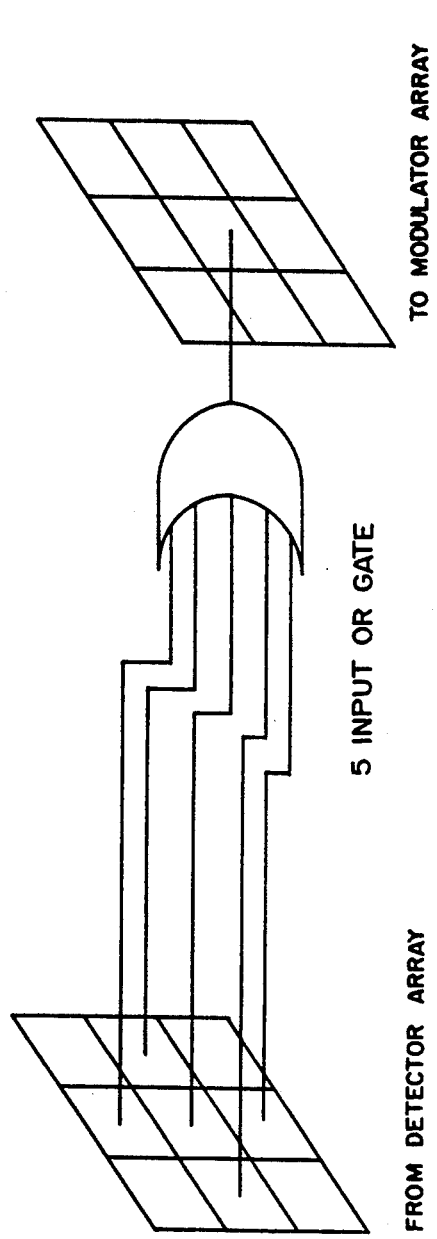
FIG. 9 illustrates the dilation morphological circuitry of the opto-electronic morphological processor of the present invention.

The erosion morphological circuitry is shown in FIG. 8 and the dilation morphological circuitry for operating on a 3×3 cross structuring element, is shown in FIG. 9. As seen in FIG. 8, the 3×3 morphological erosion operator consists of a 3×3 detector array, the outputs of which are all connected as inputs to a 5-input AND gate. The output of the AND gate is connected to a modulator array where the pixel being controlled corresponds to each pixel being tested during the morphological erosion process. On the other hand, as seen in FIG. 9, the dilation morphological circuitry connects the 3×3 dilation operator from the detector array to a 5-input OR gate, the output of which is connected to the pixel being tested in the modulator array. It will be observed that in each case of erosion morphological circuitry and dilation morphological circuitry, the inputs to the respective gates, that is the AND gate of FIG. 8 and the OR gate of FIG. 9, are derived from the pixel under test, as well as the vertically displaced pixels immediately adjacent the one under test and the horizontally displaced pixels immediately adjacent the one under test. Clearly, these particular morphological operations are readily carried out by simple logic circuitry in an electronic format which provides highly parallel capability and solves pixelation registration problems that would be present if these processes were carried out in a purely optical format. Thus, FIGS. 4 through 9 illustrate the highly advantageous capability of the present invention, namely, carrying out morphological operations in electronics as opposed to optics, by converting the optical input to an electronic morphological operation before again converting the output of the morphological operator into an optical output. In addition to the morphological operators of erosion, dilation, opening and closing as described hereinabove, the present invention is readily adapted for carrying out other morphological operations such as boundary operations, subtraction operations and skeletonization operations, all of which are deemed to be morphological operations within the scope of the present invention.

Figure 10B:
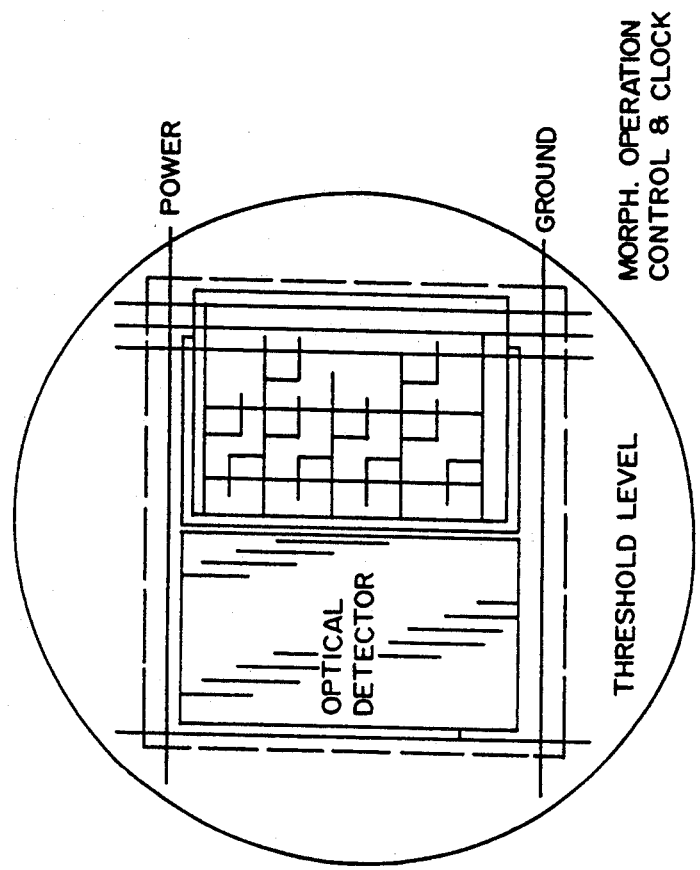
FIG. 10 illustrates the layout of the morphological optical processor circuitry of the present invention.
Figure 10A:
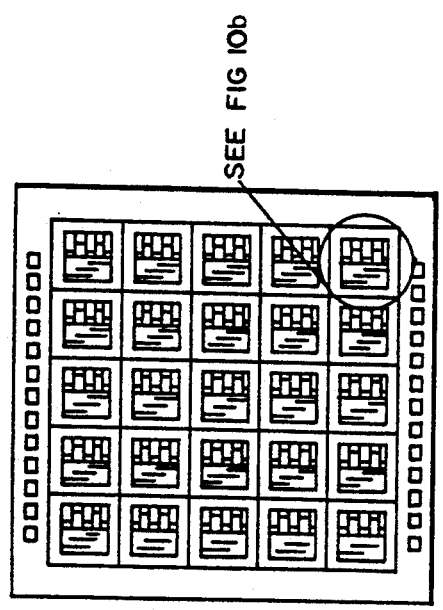
Figure 11:
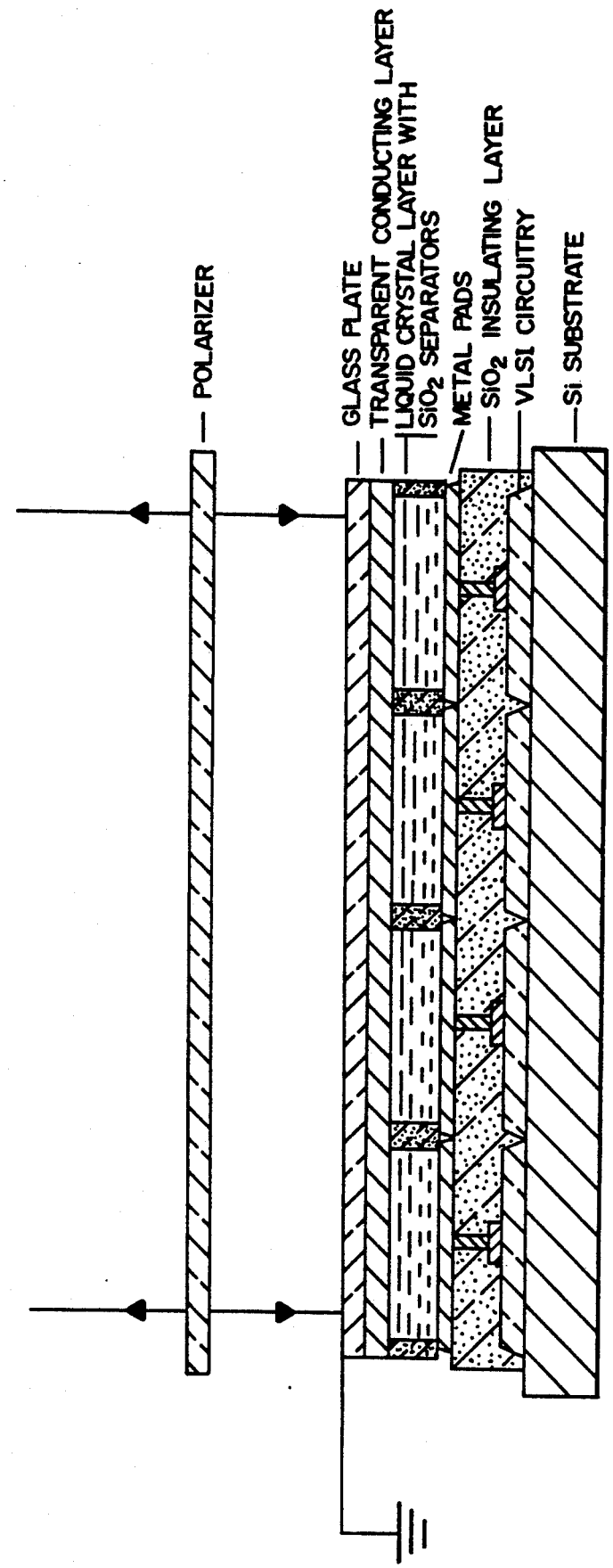
FIG. 11 is a cross sectional illustration of the modulator section of the opto-electronic morphological processor of the present invention.

Implementation of the present invention on an exemplary 32×32 pixel array integrated circuit chip is illustrated in FIGS. 10 and 11. FIG. 10 illustrates a top schematic illustration of the integrated circuit chip of the present invention, including an enlarged view of one such pixel element. As shown in FIG. 10, the chip is separated into discrete pixels. Each pixel comprises a detector, modulator pad and the modulator pad and the morphological electronics. Because each pixel is in itself a processing unit, parallel computation in the electronics is maintained. As a result, the parallelism gained from using optics for communications is maintained in the electronic processing stage. In addition, the pixelated design allows cascadability with other opto-electronic image processors which can implement other morphological operations. This allows implementation of larger opto-electronic image processing systems.

The optical detector portion of each pixel element shown in FIG. 10 is integrated into the design of the electronic morphological processor. Silicon detectors are fabricated using analog VLSI designs similar to the devices demonstrated by Carver Mead at the California Institute of Technology and an opto-electronic synaptic chip demonstrated by others at Cal-Tech. The detector comprises approximately 30-50% of the pixel area. This large size results in easier alignment of the optically transmitted images and in improved sensitivity. The analog output signal is compared against an externally-generated input signal. If the detector detects an optical signal higher than this value, the comparator produces a digital "1". If the signal is less, it produces a digital "0". The result is a thresholding and binarization of the input image. Morphological operations are then performed on this binary image as described above. Other detector technologies can be used, including for example, amorphous silicon detectors which have a much higher sensitivity than normal silicon. Whatever the detector material selected, it must be capable of the desired sensitivity to reliably produce the binary output for the morphological operations and it must exhibit a level of uniformity from detector to detector which avoids any significant inaccuracies in the input to the electronics portion of the processor.

The electronic morphological circuitry is designed on silicon using standard digital VLSI design rules. The combination of well-developed design rules, verification techniques and fabrication, allows implementation of a variety of morphological operations with varying degrees of programability. As previously described, the two major operators in the design of the morphological operation of the present invention are the erosion and dilation operators. As indicated previously, these operators are implemented using simple AND and OR gates with nearest neighbor connections. With the erosion operator using a 3×3 cross operator or structuring element which can be implemented using a 5-input AND gate, the value of each input pixel and its four nearest neighbors are ANDed. The output will only be high if all the pixels are ON. Similarly, a dilation operator can be implemented using a 5-input OR gate. In both cases, the operations require only nearest neighbor connections. This results in circuitry dominated by logic rather than by connections and makes the implementation of morphological operations with small kernels highly suitable for parallel electronic implementations. However, morphological operations on some larger kernels, such as 5×5 or 7×7 can be implemented by successively operating on a 3×3 kernel. This can be accomplished through the use of digital buffers and a relatively small amount of control logic.

Each pixel of the morphological processor consists of a few gates for each morphological operation. Because of the high density of VLSI circuitry, it is possible to integrate a variety of operators on a single chip. One example might be a chip which implements erosion, dilation and subtraction. By appropriate choice of control signals, the functionality of the processor can be determined. A basic, functional processor can then be used to implement higher order morphological operations, such as opening, closing, edge-enhancement and skeletonization.

Once the morphological operation is completed, the information is used to drive a modulator pad, which in turn, controls the reflectivity of a liquid crystal array. The liquid crystal layer is composed of a ferro-electric liquid crystal material which has a potential switching speed of 10 microseconds. In addition, the liquid crystal is binary and thus leads to a higher uniformity for the device.

A cross-section of the liquid crystal modulator is shown in FIG. 11. The electronic chip is designed so that the output signal from each pixel is used to drive a large modulator pad located above the VLSI circuitry. Above this pad, a layer of silicon dioxide is used to isolate the liquid crystal pixels. A glass plate with transparent electrodes is placed as a cover layer and ground plane over the silicon dioxide separators. The transparent electrodes can be, for example, Indium Tin Oxide, which commonly serves as a transparent electrode in liquid crystal applications. Liquid crystal material is injected between the metal pads and the glass layer. This is performed under a vacuum to prevent the formation of air bubbles in the device. In addition, the conducting layer is obliquely evaporated onto the surface of the glass layer to form a series of grooves which allow alignment with ferro-electric liquid crystal molecules. Another possible implementation is the use of nematic liquid crystals, instead of the binary ferro-electric liquid crystal. This will allow one to output analog images necessary for implementation of gray scale morphology. Major issues to be addressed in this case, as well as in the ferro-electric liquid crystal configuration, include contrast ratio, uniformity, dynamic range and speed.

As a result of the present invention, it is possible to provide an opto-electric morphological processor capable of performing binary-image morphology at high speeds with a high degree of parallelism. The processor accepts optical inputs and produces optical outputs while computing the morphological operations electronically. The design will ultimately consist of 128×128 pixels. Each pixel comprises a detector, a liquid crystal modulator and VLSI electronics to perform the morphological operations. The electronic portion of the device contains the optical detector, the morphological circuitry and a metal modulator pad. The device is fabricated on silicon, using standard VLSI design rules. The finished chip is integrated with a liquid crystal array. The device may be addressed by a laser beam to produce a coherent output.

The finished device may be used to pre-process incoming imagery to produce inputs for binary phase-only correlator. The finished device has a frame rate of about 10 KHz and is capable of performing a variety of morphological operations, including erosion, dilation, opening, closing and edge enhancement. The flexibility of the electronic implementation allows this technology to be extended to implementation of more advanced image processing and image understanding algorithms which may include segmentation and texture analysis. In addition, the optical input/optical output capability of the device, makes it a suitable opto-electronic building block for creating more complex, highly parallel, image processing systems.

Those having ordinary skill in the art to which the present invention pertains, will now as a result of the applicants' teaching herein, perceive various modifications and additions which may be made to the invention. By way of example, other pixel array configurations, other VLSI implementation techniques, as well as other means for converting optical to electronic and electronic to optical, will now occur to those having the benefit of the applicants' disclosed embodiment. Accordingly, all such modifications and additions are deemed to be within the scope of the invention, which is to be limited only by the appended claims and their equivalents.

We claim:

1. In an opto-electronic morphological processor of the type having an array of optical detectors for converting a received image into a set of corresponding binary signals and an array of morphological operators for performing morphological operations on said binary signals, a liquid crystal array for generating an image from said morphologically processed binary signals; said liquid crystal array being on an integrated circuit chip and comprising:

a silicon substrate having a plurality of VLSI gate circuits for generating said processed binary signals, each such gate circuit being connected to a metal modulator pad spaced from said gate circuit by an insulating layer;

a plurality of liquid crystal filled pixel regions separated from one another by a plurality of silicon dioxide separators, each said liquid crystal filled pixel region being positioned over a respective one of said modulator pads; and a glass plate having a transparent conductive electrode overlying said liquid crystal filled pixel regions;

whereby the binary condition of each of said binary signals effects a corresponding change in a corresponding liquid crystal filled pixel region to produce a morphologically processed image.

* * * * *